(12) United States Patent
Cofino et al.

(10) Patent No.: US 7,266,510 B1
(45) Date of Patent: *Sep. 4, 2007

(54) METHOD FOR GRAPHICALLY REPRESENTING CLICKSTREAM DATA OF A SHOPPING SESSION ON A NETWORK WITH A PARALLEL COORDINATE SYSTEM

(75) Inventors: Thomas Anthony Cofino, Rye, NY (US); Stephen H. Gomory, Tarrytown, NY (US); Juhnyoung Lee, Yorktown Heights, NY (US); Mark Edward Podlaseck, New Preston, CT (US)

(73) Assignee: International Business Machines Corporation, Armonk, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 09/653,888

(22) Filed: Sep. 1, 2000

(51) Int. Cl.
*G06Q 30/00* (2006.01)
*G06F 7/00* (2006.01)

(52) U.S. Cl. .......................... 705/26; 707/102

(58) Field of Classification Search .................. 705/26, 705/27; 707/102, 104.7; 709/203, 217
See application file for complete search history.

(56) References Cited

U.S. PATENT DOCUMENTS

| | | | |
|---|---|---|---|
| 5,546,516 A | 8/1996 | Austel et al. | |
| 6,175,838 B1 * | 1/2001 | Papierniak et al. | 707/223 |
| 6,223,215 B1 * | 4/2001 | Hunt et al. | 709/217 |
| 6,286,030 B1 * | 9/2001 | Wenig et al. | 709/23 |
| 6,393,479 B1 * | 5/2002 | Glommen et al. | 709/224 |
| 6,405,214 B1 * | 6/2002 | Meade, II | 707/104.1 |
| 6,470,383 B1 * | 10/2002 | Leshem et al. | 709/223 |
| 6,477,538 B2 * | 11/2002 | Yaginuma et al. | 707/102 |
| 6,785,666 B1 * | 8/2004 | Nareddy et al. | 707/1 |
| 2002/0070953 A1 * | 6/2002 | Barg et al. | 345/700 |

FOREIGN PATENT DOCUMENTS

WO WO9831114 A1 * 7/1998

OTHER PUBLICATIONS

"Westaim technology investment, Savvion, partners with Fujitsu to build smarter e-business solutions" PR Newswire; New York; Aug. 11, 2000.*

J. Lee, L. Morgenstern, M. Podlaseck, E. Schonberg and D. Wood, "A System and Method for Collecting and Analyzing Information About Content Requested in a Network (World Wide Web) Environment," filed in the U.S. Patent and Trademark Office in Jan. 27, 1999.

J. Lee, L. Morgenstern, M. Podlaseck, E. Schonberg and D. Wood, "Aggregating and Analyzing Information About Content Requested in an E-Commerce Web Environment to Determine Conversion Rates," filed in the U.S. Patent and Trademark Office in Jan. 27, 1999.

(Continued)

*Primary Examiner*—Jeffrey A. Smith
*Assistant Examiner*—Amee A. Shah
(74) *Attorney, Agent, or Firm*—Harrington & Smith, PC

(57) ABSTRACT

An interactive parallel coordinate system is used in a business method to provide users with greater abilities to interpret and explore the clickstream data of online stores on the Web. The interactive parallel coordinate system uses the multiple axes of the system to represent steps of a process with respect to an independent variable. Specifically, the process steps are sequential steps which sessions take during their navigation of a Web site.

10 Claims, 13 Drawing Sheets

OTHER PUBLICATIONS

J. Lee, M. Podlaseck, E. Schonberg, R. Hoch and S. Gomory, "Understanding Merchandising Effectiveness of Online Stores," *Electronic Markets*, vol. 10(1):20-28, 2000.

S.V. Haar, "Web Metrics: Go Figure," *Business 2.0*, Jun. 1999.

T. Wilson, "Web Site Mining Gets Granular," *InterWeek*, Mar. 29, 1999.

\* cited by examiner

| TIMESTAMP | SESSION ID | REFERRER | CURRENT PAGE | LINKS |
|---|---|---|---|---|
| T1 | S1 | R1 | HOME | A, B, P1, SEARCH |
| T2 | S2 | R2 | HOME | A, B, P1, SEARCH |
| T3 | S1 | HOME | A | A1, A2 |
| T4 | S3 | R3 | HOME | A, B, P1, SEARCH |
| T5 | S2 | HOME | SEARCH | |
| T6 | S1 | A | A1 | BASKET, A |
| T7 | S3 | HOME | P1 | BASKET |
| T8 | S1 | A1 | BASKET | PURCHASE, HOME |
| T9 | S2 | SEARCH | SEARCH RESULT | A2, B1, B2 |
| T10 | S1 | BASKET | HOME | A, B, P1, SEARCH |
| T11 | S2 | SEARCH RESULT | B1 | BASKET, B |
| T12 | S1 | HOME | B | B1, B2, B3 |
| T13 | S1 | B | B2 | BASKET, B |
| T14 | S1 | B2 | B | B1, B2, B3 |
| T15 | S2 | B1 | BASKET | PURCHASE, HOME |
| T16 | S1 | B | B3 | BASKET, B |
| T17 | S2 | BASKET | PURCHASE | THANK YOU |
| T18 | S3 | P1 | HOME | A, B, P1, SEARCH |
| T19 | S1 | B3 | BASKET | PURCHASE, HOME |
| T20 | S1 | BASKET | PURCHASE | THANK YOU |
| T21 | S1 | PURCHASE | THANK YOU | |
| T22 | S3 | HOME | A | A1, A2 |
| T23 | S2 | PURCHASE | THANK YOU | HOME |

FIG. 4

(a) SESSION S1 — 501

| TIMESTAMP | SESSION ID | REFERRER | CURRENT PAGE | LINKS |
|---|---|---|---|---|
| T1 | S1 | R1 | HOME | A, B, P1, SEARCH |
| T3 | S1 | HOME | A | A1, A2 |
| T6 | S1 | A | A1 | BASKET, A |
| T8 | S1 | A1 | BASKET | PURCHASE, HOME |
| T10 | S1 | BASKET | HOME | A, B, P1, SEARCH |
| T12 | S1 | HOME | B | B1, B2, B3 |
| T13 | S1 | B | B2 | BASKET, B |
| T14 | S1 | B2 | B | B1, B2, B3 |
| T16 | S1 | B | B3 | BASKET, B |
| T19 | S1 | B3 | BASKET | PURCHASE, HOME |
| T20 | S1 | BASKET | PURCHASE | THANK YOU |
| T21 | S1 | PURCHASE | THANK YOU | HOME |

(b) SESSION S2 — 502

| TIMESTAMP | SESSION ID | REFERRER | CURRENT PAGE | LINKS |
|---|---|---|---|---|
| T2 | S2 | R2 | HOME | A, B, P1, SEARCH |
| T5 | S2 | HOME | SEARCH | |
| T9 | S2 | SEARCH | SEARCH RESULT | A2, B1, B2 |
| T11 | S2 | SEARCH RESULT | B1 | BASKET, B |
| T15 | S2 | B1 | BASKET | PURCHASE, HOME |
| T17 | S2 | BASKET | PURCHASE | THANK YOU |
| T23 | S2 | PURCHASE | THANK YOU | HOME |

(c) SESSION S3 — 503

| TIMESTAMP | SESSION ID | REFERRER | CURRENT PAGE | LINKS |
|---|---|---|---|---|
| T4 | S3 | R3 | HOME | A, B, P1, SEARCH |
| T7 | S3 | HOME | P1 | BASKET |
| T18 | S3 | P1 | HOME | A, B, P1, SEARCH |
| T22 | S3 | HOME | A | A1, A2 |

FIG.5

| PRODUCT IMPRESSIONS | CLICK-THROUGHS | BASKET PLACEMENT | PURCHASE |
|---|---|---|---|
| T1, P1 | T6, A1 | T8, A1 | T20, A1 |
| T3, A1 | T13, B2 | T19, B3 | T20, B3 |
| T2, A2 | T16, B3 | | |
| T10, P1 | | | |
| T12, B1 | | | |
| T12, B2 | | | |
| T12, B3 | | | |
| T14, B1 | | | |
| T14, B2 | | | |
| T14, B3 | | | |

(a) MICRO-CONVERSIONS OF SESSION S1

| PRODUCT IMPRESSIONS | CLICK-THROUGHS | BASKET PLACEMENT | PURCHASE |
|---|---|---|---|
| T2, P1 | T11, B1 | T15, B1 | T17, B1 |
| T9, A2 | | | |
| T9, B1 | | | |
| T9, B2 | | | |

(b) MICRO-CONVERSIONS OF SESSION S2

| PRODUCT IMPRESSIONS | CLICK-THROUGHS | BASKET PLACEMENT | PURCHASE |
|---|---|---|---|
| T4, P1 | T7, P1 | | |
| T18, P1 | | | |
| T22, A1 | | | |
| T22, A2 | | | |

(c) MICRO-CONVERSIONS OF SESSION S3

FIG.6

| TIMESTAMP | SESSION ID | STORE | REFERRER | CURRENT PAGE | LINKS |
|---|---|---|---|---|---|
| T4 | S3 | ST1 | R3 | HOME | A, B, P1, SEARCH |
| T7 | S3 | ST1 | HOME | P1 | BASKET |
| T18 | S3 | ST1 | P1 | HOME | A, B, P1, SEARCH |
| T22 | S3 | ST1 | HOME | A | A1, A2 |
| T23 | S3 | ST2 | ST1 | HOME | B, C, D, SEARCH |
| T24 | S3 | ST2 | HOME | SEARCH | |
| T25 | S3 | ST2 | SEARCH | SEARCH RESULTS | C2, C3, D1 |
| T26 | S3 | ST2 | SEARCH RESULTS | C2 | BASKET, C |
| T27 | S3 | ST2 | C2 | SEARCH RESULTS | C2, C3, D1 |
| T28 | S3 | ST2 | SEARCH RESULTS | C3 | BASKET, C |
| T29 | S3 | ST3 | ST2 | HOME | A, B, C, D, SEARCH |
| T30 | S3 | ST3 | HOME | SEARCH | |
| T31 | S3 | ST3 | SEARCH | SEARCH RESULTS | A1, B1, C3, D2 |
| T32 | S3 | ST3 | SEARCH RESULTS | D2 | BASKET, D |
| T33 | S3 | ST3 | D2 | BASKET | PURCHASE, HOME |
| T34 | S3 | ST3 | BASKET | HOME | A, B, C, D, SEARCH |
| T35 | S3 | ST3 | HOME | D | D1, D2, D3 |
| T36 | S3 | ST3 | D | D3 | BASKET, D |
| T37 | S3 | ST3 | D3 | BASKET | PURCHASE, HOME |
| T38 | S3 | ST3 | BASKET | PURCHASE | THANK YOU |
| T39 | S3 | ST3 | PURCHASE | THANK YOU | HOME |

FIG.10

| PRODUCT IMPRESSIONS ⌐1101 | CLICK-THROUGHS ⌐1102 | BASKET PLACEMENT ⌐1103 | PURCHASE ⌐1104 |
|---|---|---|---|
| T4, P1, ST1 | T7, P1, ST1 | T33, D2, ST3 | T38, D2, ST3 |
| T18, P1, ST1 | T26, C2, ST2 | T37, D3, ST3 | T38, D3, ST3 |
| T22, A1, ST1 | T28, C3, ST2 | | |
| T22, A2, ST1 | T32, D2, ST3 | | |
| T25, C1, ST2 | T36, D3, ST3 | | |
| T25, C3, ST2 | | | |
| T25, D1, ST2 | | | |
| T27, C2, ST2 | | | |
| T27, C3, ST2 | | | |
| T27, D1, ST2 | | | |
| T31, A1, ST3 | | | |
| T31, B1, ST3 | | | |
| T31, C3, ST3 | | | |
| T31, D2, ST3 | | | |
| T35, D1, ST3 | | | |
| T35, D2, ST3 | | | |
| T35, D3, ST3 | | | |

FIG.11

METHOD FOR GRAPHICALLY REPRESENTING CLICKSTREAM DATA OF A SHOPPING SESSION ON A NETWORK WITH A PARALLEL COORDINATE SYSTEM

FIELD OF THE INVENTION

This invention relates to shopping on a computer network. More specifically, the invention relates to the visualization and analysis of clickstream data from one or more online stores where clickstream data is visualized and analyzed by using an extended parallel coordinate system.

BACKGROUND OF THE INVENTION

Commerce over networks, particularly e-commerce over the Internet, has increased significantly over the past few years. Part of e-commerce enables users/customers to access information of products and to purchase them from various commercial Web sites (i.e. online stores). There are numerous online stores currently operating in the Internet including: Amazon.com, eToys.com, Buy.com, Wal-Mart.com, LLBean.com, and Macys.com. These online stores provide various customer services to make commerce activities possible over Web sites. Some of the examples of the basic services are catalogs of merchandise which are both browsable and searchable by various product attributes (e.g., keyword, name, manufacturer, and model number), shopping carts, and checkout process. Some online stores also provide advanced customer services such as wish lists, gift registries, calendars, custom-configuration of products, buyer's groups, chatting, e-mail notification, product evaluations, product recommendations and in-context sales.

As shopping experience in the Internet gets deeper and broader, it becomes an important task for merchants of online stores to understand and analyze the shopping behavior of customers and to improve the shopping experience in their online stores by using this analysis. A basic unit for such analysis is clickstream data from online stores. Clickstream is a generic term to describe visitors' paths through one or more Web sites. A series of Web pages requested by a visitor in a single visit is referred to as a session. Clickstream data in an online store is a collection of sessions on the site. Clickstream data can be derived from raw page requests (referred to as hits) and their associated information (such as timestamp, IP address, URL, status, number of transferred bytes, referrer, user agent, and, sometimes, cookie data) recorded in Web server log files. Analysis of clickstreams shows how a Web site is navigated and used by its visitors.

In an e-commerce environment, clickstreams in online stores provide information essential to understanding the effectiveness of marketing and merchandising efforts, such as how customers find the store, what products they see, and what products they buy. (While not all this information may be available from Web server log files, it can be extracted from associated data sources such as commerce server databases and tied together with HTTP request data.) Analyzing such information embedded in clickstream data is critical to improve the effectiveness of Web marketing and merchandising in online stores. Interest in interpreting Web usage data in Web server log files has spawned an active market for Web log analysis tools that analyze, summarize, and visualize Web usage patterns.

PROBLEMS WITH THE PRIOR ART

Interest in interpreting Web usage data in Web server log files has spawned an active market for Web log analysis tools that analyze, summarize, and visualize Web usage patterns.

While useful to some extent, most of existing tools have the following shortcomings: (1) the summaries they provide obscure useful detail information, (2) the static displays such as histograms and pie charts restrict users to passive interpretation, and (3) the weak (or lack of) connection between purchase data and navigation data limits the ability to understand the site's effectiveness in terms of return on investment.

OBJECTS OF THE INVENTION

An object of this invention is an improved system and method for showing steps in a process relative to an independent variable.

An object of this invention is an improved system and method for showing sequential steps in a process, specifically the clickstream data of a web site.

An object of this invention is an improved system and method for showing click stream data of a web site that does not obscure detailed information.

An object of this invention is an improved system and method for showing click stream data on a web site that includes both purchase data and navigation data.

SUMMARY OF THE INVENTION

This invention presents an interactive parallel coordinate system that can be used to provide users with greater abilities to interpret and explore clickstream data of online stores on the Web. The interactive parallel coordinate system in this invention uses the multiple axes of the system to represent steps of a process with respect to an independent variable. Specifically, the process steps are sequential steps which sessions take during their navigation of a Web site.

In a preferred embodiment, the sessions are displayed as respective polygonal lines on a parallel coordinate system. That is, the clickstream of a session is represented by a polygonal line that intersects its value in each axis selected in the parallel coordinate system. With one or more variables such as referrers and host names that categorize sessions assigned to axes, the system can visualize the relationship between session categories and navigation paths. In one embodiment, by looking at the last axis a polygonal line intersects, it is straightforward to see at what point sessions leave the site. In order to help users actively explore and interpret data of interest, this system provides facilities for filtering, sampling, clustering, color coding, and dynamic querying.

BRIEF DESCRIPTION OF THE FIGURES

The foregoing and other objects, aspects, and advantages will be better understood from the following non-limiting detailed description of preferred embodiments of the invention with reference to the drawings that include the following:

FIG. 4 is an example of a Web server log of an online store.

FIG. 5 is an example of sessions in an online store used in one preferred embodiment.

FIG. 6 is an example of micro-conversions in an online store.

FIG. 10 is an example of a session browsing more than one online stores.

FIG. 11 is an example of micro-conversions of a session browsing more than one online stores.

DETAILED DESCRIPTION OF THE INVENTION

Figure 1:
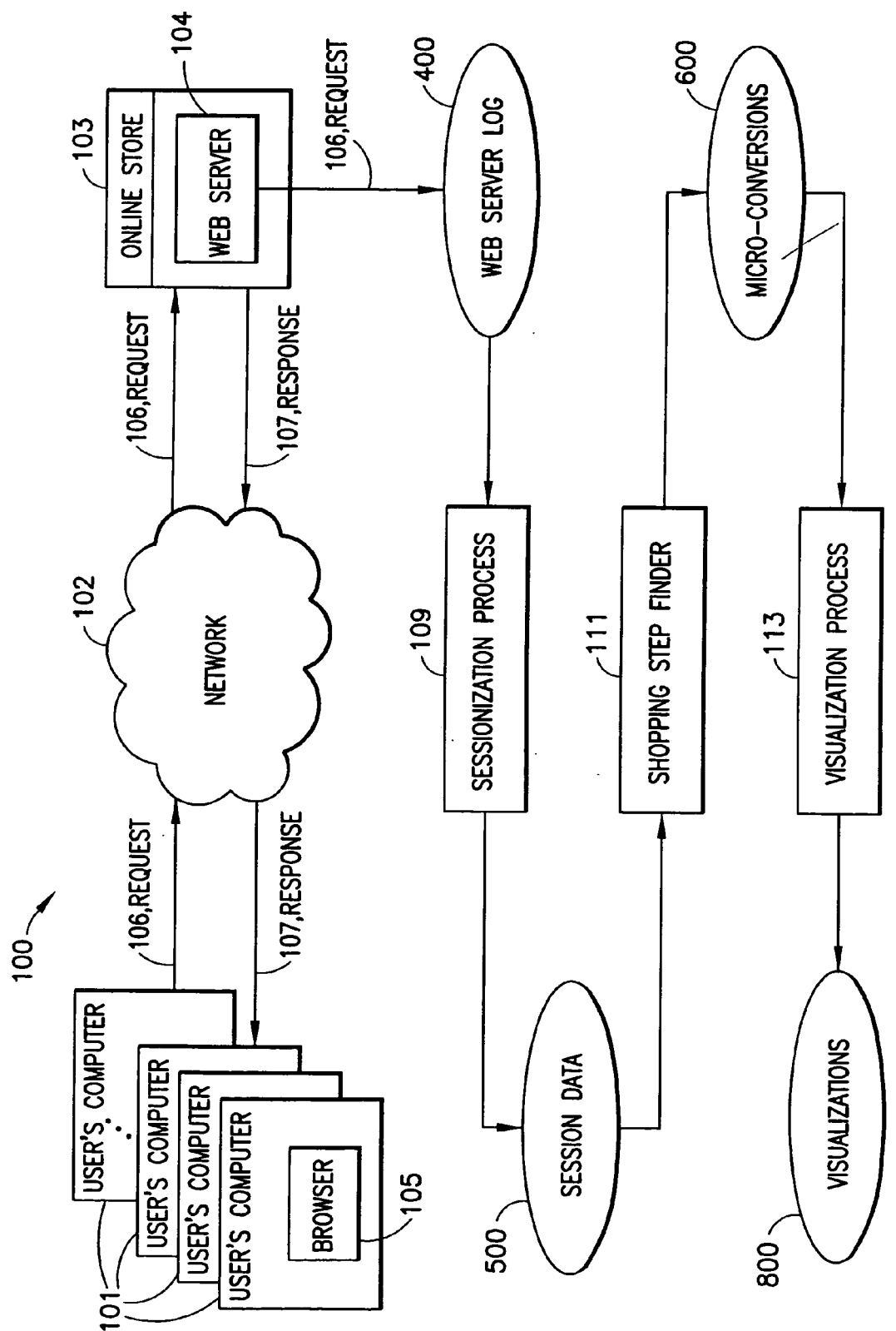
FIG. 1 is a block diagram of one preferred system architecture.

This invention presents an interactive parallel coordinate system that can be used to provide users with greater abilities to interpret and explore clickstream data of online stores on the Web. Parallel coordinates are a visualization method for displaying multivariate data sets to identify the relationship among the variables. A parallel coordinate system comprises a series of parallel lines that are placed perpendicular to the x-axis (or y-axis) of a Cartesian coordinate system, and preferably each adjacent axis is equidistant, although equidistance is not required. Each parallel axis is assigned a specific dependent variable and dependent variable values are plotted along the respective axis. The independent variable is represented by polygonal lines which connect the corresponding dependent variable values relating to the independent variable and illustrating a relationship between an independent variable and the dependent variables appearing on each axis.

The interactive parallel coordinate system in this invention uses the multiple axes of the system to represent sequential steps which sessions take during their navigation of a Web site, and displays a large number of individual sessions as polygonal lines. The session is a set of events (that may be divided into subsets of events). Each of the axes represents one of the events in the session. An independent variable associated with the event represented on the respective axis is plotted for one or more of the events in the session. For example, the clickstream of a session is represented by a polygonal line that intersects its time stamp value for an event represented by the respective axis for the event.

In an alternative embodiment, sessions can be further classified. For example, one or more axes of the parallel coordinate system can be used to classify the sessions by having the classifier as a variable of the axis. For example, if the variable of the "classifier axis" is service provider, all sessions initiated from service provider "A" would start from point "A" on the classifier axis while all sessions initiated from service provider "B" would start from point "B" on the classifier axis. For instance, with one or more variables such as referrers and host names that categorize sessions assigned to axes, the system can visualize the relationship between session categories and navigation paths.

In one embodiment, the sessions do not always have events plotted on all of the axes. By arranging the axes in time sequence order, a user can determine at which point in the time sequence order each of the sessions ended. If a particular axis is chosen as a "terminal step", e.g. product purchase, this invention gives the user a clear visual indication of how many of the sessions ended at the "terminal step", e.g. how many customer sessions ended in a product purchase. Further, by looking at the axis at which a polygonal line ends, it is straightforward to see at what point sessions leave the site.

In other embodiments, the invention helps users actively explore and interpret data of interest, by providing facilities for filtering, color coding, sub-categorizing, and dynamic querying.

FIG. 1 (100) is a block diagram of one preferred system architecture showing one or more computers used by shoppers (101), an online store on the Internet (103), a computer network (102) which is used for communication between the user computers (101) and the online store (103), the sessionization process (109) that converts web server log data (400) from the online store (103) into session data (500), the shopping step finder process (111) that converts session data (500) into micro-conversion data (600), and the visualization process (113) that converts micro-conversion data (600) into visualizations of shopping activities (800) by using a parallel coordinate system.

When a shopper intends to find certain product information and/or purchase one or more products by using the Internet (102), he/she starts a Web browser program (105) in his/her computer (101) and accesses an online store (103) on the Internet which sells the products of interest. Online stores (103) are implemented with a Web server system (104) which receives Web page requests (106) from shoppers and sends out requested Web pages (107) back to shoppers. For this communication between the shopper's computer (101) and the online store (103), the Web browser program (105) and Web server (104) typically use HTTP (HyperText Transfer Protocol), which is a network protocol defined and implemented for this purpose. A shopper navigates an online store (103), i.e., requests Web pages over the network (102) and browses Web pages which provide information of one or more products sold in the store.

The Web server system (104) in the online store (103) records shoppers' navigation of the online store (103) in its Web server log (400). Namely, the Web server system (104) records all the requests (106) it receives from shoppers in the Web server log (400) along with auxiliary data such as timestamp (401), session ID (402), referrer (403), and links shown in the requested Web page (405) for each request (106). The details of these auxiliary data will be described later in FIG. 4 (400). In a preferred embodiment a sessionization process (109) receives a group of requests (106) stored in the Web server log (400) as input and extracts sessions (500) from the requests. In this embodiment, the sessionization process (109) comprises sorting the Web server log (400) by session ID (402) and then by timestamp (401). Other embodiments are envisioned.

A session is a series of Web page requests (106) by one shopper in a single visit. The shopping step finder process (111) is described in detail in FIG. 6A. In general, the shopping step finder process determines if there is a request that matches one of the axes of the parallel coordinate system and what the value is of the independent variable to be plotted on the respective axis. For example, the finder process takes sessions (500) extracted by the sessionization process (109) as input and identifies products seen in each shopping step of each session (500) in the input. The output of the shopping step finder process (111) is referred to as micro-conversions (600) and, in this example, shows how many products seen in one shopping step are converted into the next shopping step.

In a non-limiting example, one preferred group of shopping steps includes product impression (604), clickthrough (605), basket placement (606), and purchase (607) and will be described in detail in FIG. 6 (600).

For a more detailed description of micro-conversion, refer to U.S. Pat. No. 6,466,970, to J. Lee, L. Morgenstern, M. Podlaseck, E. Schonberg, and D. Wood, entitled "A System and Method for Collecting and Analyzing Information About Content Requested in a Network (World Wide Web) Environment" issued on Oct. 15, 2002, and U.S. patent application Ser. No. 09/238,348 to J. Lee, L. Morgenstern, M. Podlaseck, E. Schonberg, and D. Wood, entitled "Aggregating and Analyzing Information about Content Requested in an E-Commerce Web Environment to Determine Conversion Rates", filed on Jan. 27, 1999.

Finally, the visualization process (113) takes as input the micro-conversions (600) generated by the previous process (111) and generates as output one or more visualizations of shopping activities (800) in the online store by using a parallel coordinate system. The visualization process (113) plots the independent variable value on the respective axis for each request that has a matching axis in the parallel coordinate system. In a preferred embodiment, the visualization process also generates the polygonal line (using known techniques) to connect the plotted points on each of the respective axes. In alternative embodiments, the visualization process (113) plots lines of different types (e.g. different line thickness, color, type, etc.) to further subcategorize the plotted features. For example, sessions started by different customer classes can be designated by different color lines. Sessions also can be categorized by other criteria such as the type of the visited online store, and the type and version of the used browser program and/or operating system.

See U.S. patent application Ser. No. 09/654,202 entitled SYSTEM AND METHOD FOR VISUALLY ANALYZING CLICKSTREAM DATA WITH A PARALLEL COORDINATE SYSTEM, filed on Sep. 1, 2000, to Juhnyoung Lee et al., which is herein incorporated by reference in its entirety.

Figure 2:
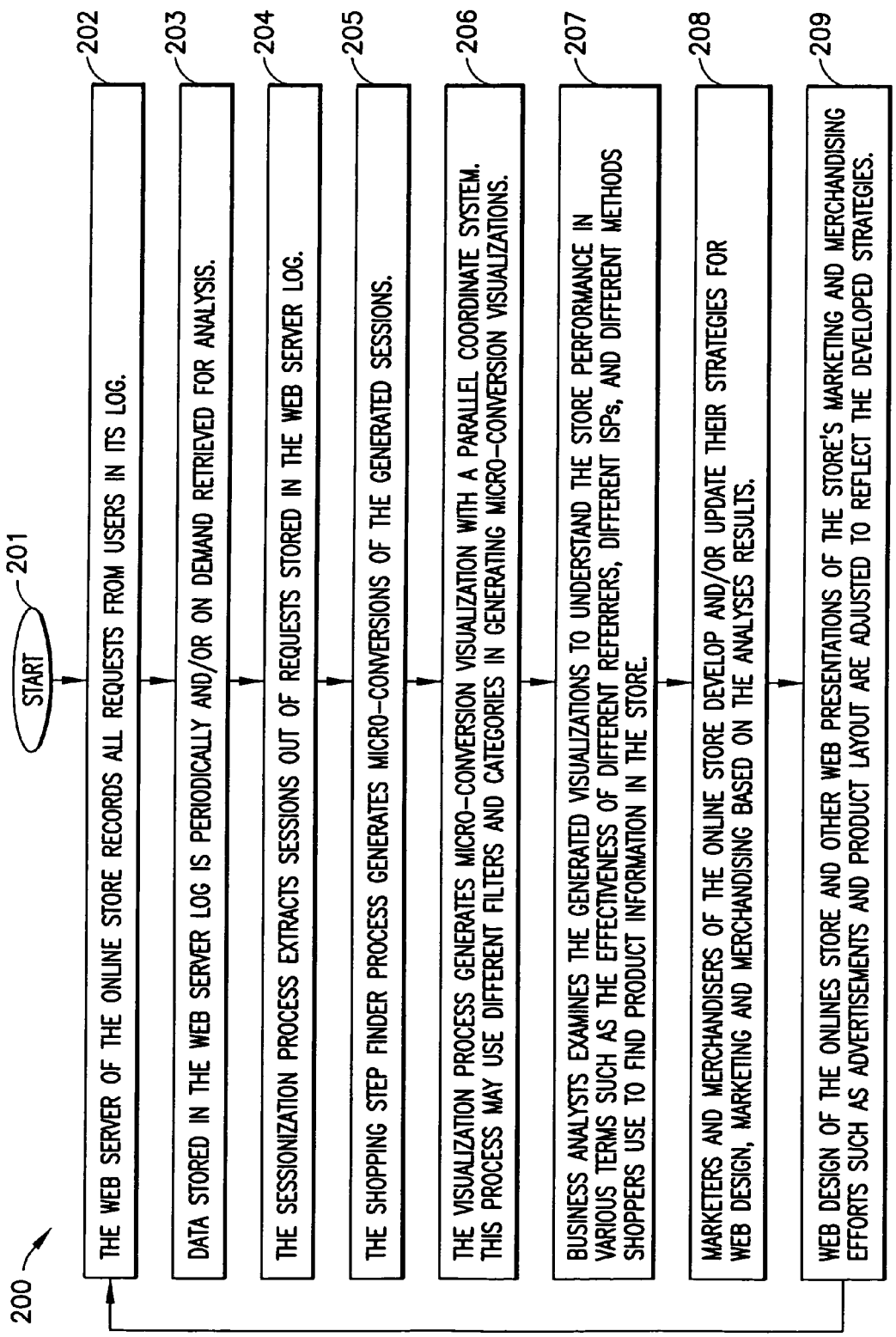
FIG. 2 is a flow chart of a preferred business process.

FIG. 2 (200) is a flow chart of a preferred business process. The current invention which provides visualizations of shoppers' activities (800) in an online store (103) can be used by merchants of the online store to understand the effectiveness of their store and/or identify one or more bottlenecks of their store. The merchants can use this information to adjust their Web design and/or merchandising and marketing strategies to improve the performance of their store. The first step (202) of this business process starts with the Web server system (104) of the online store (103) recording all requests (106) from shoppers in its Web server log (400). Then (203), data stored in the Web server log (400) is periodically, say, daily, and/or on demand, retrieved for analysis. Next (204, 205 and 206, respectively), as explained earlier, the Web server log data (400) is processed by the sessionization process (109), the shopping step finder process (111), and the visualization process (113) to generate one or more visualizations of shoppers' activities (800) in the online store (103).

In some preferred embodiments, the generated visualizations (800) typically come with various filters which business analysts can interactively use to select and/or deselect one or more groups of data for their needs. For example, the business analysts can identify where the store loses customers and how many customers are lost, understand the effectiveness of different merchandising tactics, and understand and compare the shopping behavior of different groups of shoppers, e.g., shoppers from different referrers (Web sites which lead the shopper to this online store), shoppers from different ISPs (Internet Service Providers), and/or shoppers who use different methods to find product information in the store (e.g., hierarchical browsing, keyword search, parametric search, and/or recommendations). The use of filters with the visualizations (800) will be described in detail in FIGS. 9 (900), 6 (600), and 6A (650).

Next (207), by examining the generated visualizations of shoppers' activities (800) in the online store (103), business analysts understand the effectiveness of their store and/or identify one or more problems with their store such as a broken link to promoted products, or a lengthy and cumbersome checkout process. Business analysts make recommendations for store improvement based their findings.

By using the analysis results from the business analysts, marketers, merchandisers, and Web designers of the online store (103) develop and/or update their strategies for Web design, marketing and merchandising (208), and generate appropriate recommendations for the new/updated strategies. Finally (209), the recommendations from the Web designers, marketers and merchandisers are passed on to the Web programmers and administrators of the online store (103), who implement the recommended changes to the Web appearance and/or navigation paths of the online store (103) and other Web presentation of the store's marketing and merchandising efforts such as advertisement banners and other links in portal sites such as Yahoo!, AltaVista, Lycos, and Excite@Home.

Figure 3:
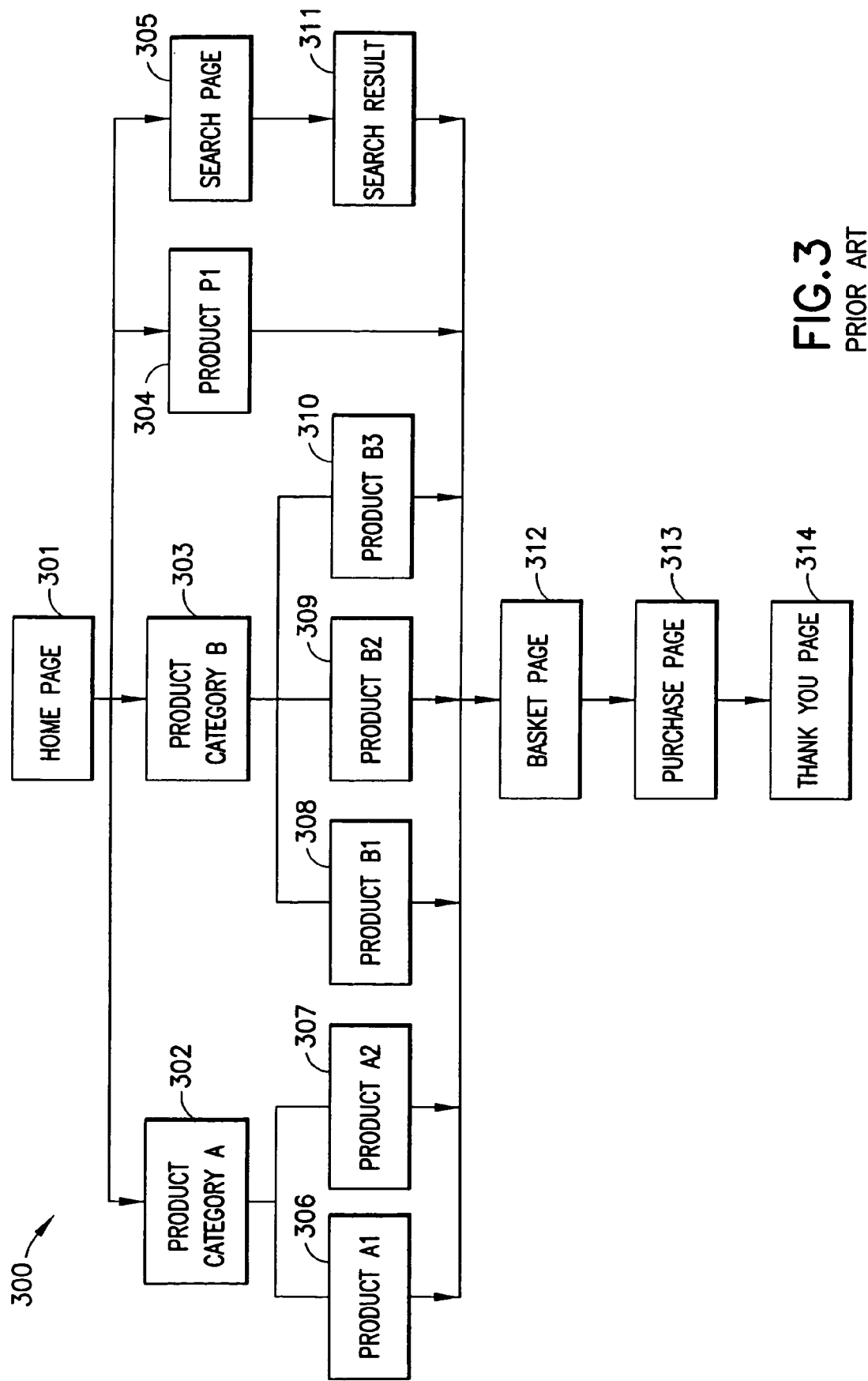
FIG. 3 is an example of an online store structure.

FIG. 3 (300) is an example of a prior art online store structure showing all the Web pages shoppers of the store (103) can request. They include Home page (301), Product category A (302), Product category B (303), Product P1 (304) which is promoted from the Home page (301), Search (305) and Search Result page (311), Product A1 (306) and A2 (307) which belong to product category A (302), Product B1 (308), B2 (309) and B3 (310) which belong to product category B (303), Shopping basket page (312), Purchase page (313), and Thank you page (315). An arrowhead line between two boxes in the figure mean that there a link from the source page to the destination page so that a shopper can directly access the destination page from the source page. That is, a Web page contains hyperlinks in it to all the destination pages which are accessible from this page. For example, Product P1 page (304) is directly accessible from Home page (301), but not from Product A1 page (306). Also, Home page (303) contains hyperlinks to four different Web pages, Product category A (302), Product category B (303), Product P1 (304), and Search page (305). Product P1 page (304) contains only one hyperlink to Basket page (312). Note that Search Result page (311) is a dynamic page whose content changes based on the keyword(s) used in the Search page (305). The Search Result page (311) can contain zero or more hyperlinks to product pages in addition to a hyperlink to Basket page (312).

FIG. 4 (400) is an example of a Web server log of an online store showing a number of requests (106) to an online store (103) whose structure was shown in FIG. 3 (300). Each request comprises several attributes including timestamp (401), session ID (402), referrer (403), requested page (404), and links (405). Timestamp (401) is the system-generated time when the request was made to the Web server system (104). In this log data (400), requests are sorted by timestamp in an ascending order. Session ID (402) is a unique identification number for different sessions. As explained earlier, a session is a series of Web page requested by a shopper in a single visit. In this log data (400), there are three sessions whose ids are S1, S2 and S3. Requests from these three sessions are interleaved in the log by their timestamp. A referrer (403) is the Web page the shopper was on when he/she makes this request. For example, the referrer of the first request of session S1 (made at T1) is R1, an external Web page, while the referrer of the second request of S1 (made at T3) is Home page which was the current page (404) of the previous request. Links (405) are hyperlinks contained in the current page (404). For example, at T1, the links (405) of the current page (404), i.e., Home page (301) are Product category A (302), Product category B (303), Product P1 (304), and Search page (305). At T9, the links (405) of the current page (404), i.e., Search Result page (311) are hyperlinks to three product pages, i.e., A2 (307), B1 (308), and B2 (309) which are dynamically generated by the search function of the online store. The use of these links (405) in the server log (400) is novel.

FIG. 5 (500) is an example of sessions in an online store showing three sessions extracted from Web server log (400). The sessionization process (109) extracts sessions from requests (106) in Web server log (400) by using timestamp (401) and session ID (402). In this example, the process (109) extracts three sessions S I (501), S2 (502) and S3 (503). The structure of each session is the same as that of Web server log (400) having timestamp (501), session ID (505), Referrer (506), current page (507) and links (508). The requests in each session is the same as those in Web server log (400) except they are now separated in different session tables, one table for each session.

FIG. 6 (600) is an example of micro-conversions in an online store showing conversions of different sessions (i.e., shoppers) (500) among different shopping steps. The shopping step finder process (11) identifies products seen in each shopping step in consideration. One preferred group of shopping steps in online stores comprises the following four steps: product impression (the view of hyperlinks to a Web page presenting a product) (604), clickthrough (the click on the hyperlink and view the Web page of the product) (605), basket placement (the placement of the item in the shopping basket) (606), and purchase (the purchase of the item, i.e., completion of the transaction) (607). Micro-conversion means a shopper moving to a next shopping step for a product. In this example, the shopping step finder (111) generates one micro-conversion table for each of sessions S1 (601), S2 (602), and S3 (603). For example, S1 (601) has product impressions at five times, T1, T3, T10, T12, and T14. At T1, S1 sees an impression of P1. At T3, S1 sees impressions of A1 and A2. At T10, S1 sees an impression of P1. At T12, S1 sees impressions of B1, B2, and B3. At T14, again S1 sees impressions of B1, B2, and B3. Among these product impressions, only three are converted to clickthroughs, i.e., A1 at T3, B2 at T12, and B3 at T14. Then, two clickthroughs out of these three are converted to basket placements, A1 and B3. Finally, both basket placements, i.e., A1 and B3, are converted into purchases. The shopping step finder process (111) identifies micro-conversions of sessions S2 and S3 in a similar way, and generates the micro-conversion tables (600(b) and 600(c)).

Figure 6A:
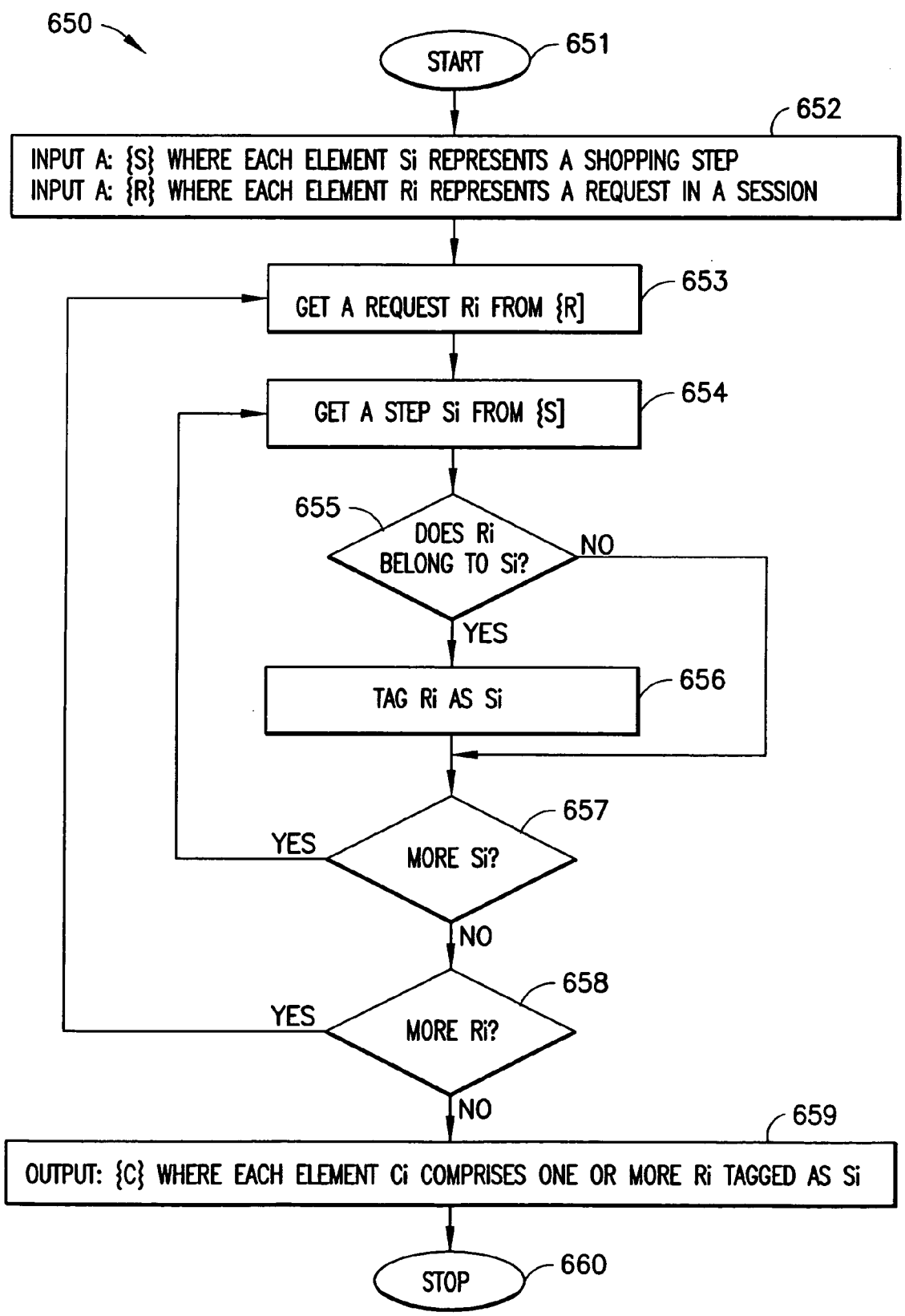
FIG. 6A is a flow chart of a shopping step finder process.

FIG. 6A (650) is a flow chart of a shopping step finder process (111). The process starts with two types of input: a set of requests in a session denoted as {R}, and a set of (shopping) steps, denoted as {S}, that the process will identify in the requests belongs to {R}. The elements of {S}, i.e., (shopping) steps, provide criteria for deciding if a request belongs to each of the steps. For example, a request in a session belongs to the step of product impressions (604) if the Web page of the request (507) contains one or more hyperlinks (508) to a product page. Also, a request belongs to the step of clickthroughs (605) if the current page of the request (507) is a product page. A request belongs to the step of basket placement (606) if the current page of the request (507) is a basket page. Finally, a request belongs to the step of purchase (607) if the current page of the request (507) is a purchase page.

The shopping step finder process (111 and 650) checks which request belongs to what step by using the decision criteria of each step (655). When the process finds a request belonging to a step, it tags the request as an element of the step (656). After going through this checking for every element in {R}, i.e., every request in the given session, for every step in (S1, the process outputs another set {C} whose elements Ci represent micro-conversions comprising one or more requests tagged as a particular step, Si, of {S} (659). The shopping step finder process (111 and 650) is executed for every session (500) to identify shopping steps of the sessions that will be visualized by a parallel coordinate system (113).

Figure 7:
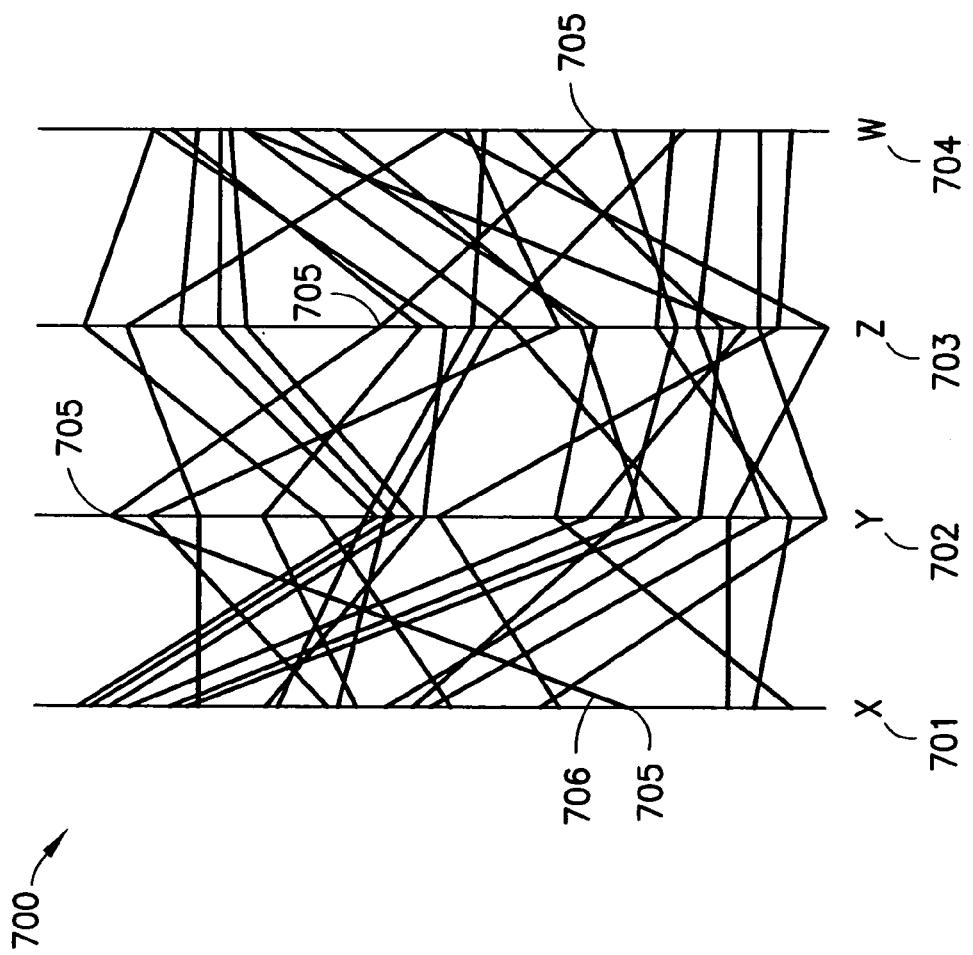
FIG. 7 is an example of a prior art parallel coordinate system.

FIG. 7 (700) is an example of a prior art parallel coordinate system which was developed for displaying multivariate data sets to identify the relationship among the variables in the set. A parallel coordinate system (700) comprises a series of parallel lines (701, 702, 703, and 704) that are placed equidistantly. Each parallel axis is assigned a specific dependent variable (e.g., X (701), Y (702), Z (703) and W (704)) and dependent variable values (705) are plotted along the respective axis. The independent variable is represented by polygonal lines (706) which connect the corresponding dependent variable values (also referred to as data points) (705) and which illustrate a relationship between an independent variable and the dependent variables appearing on each axis.

Figure 8:
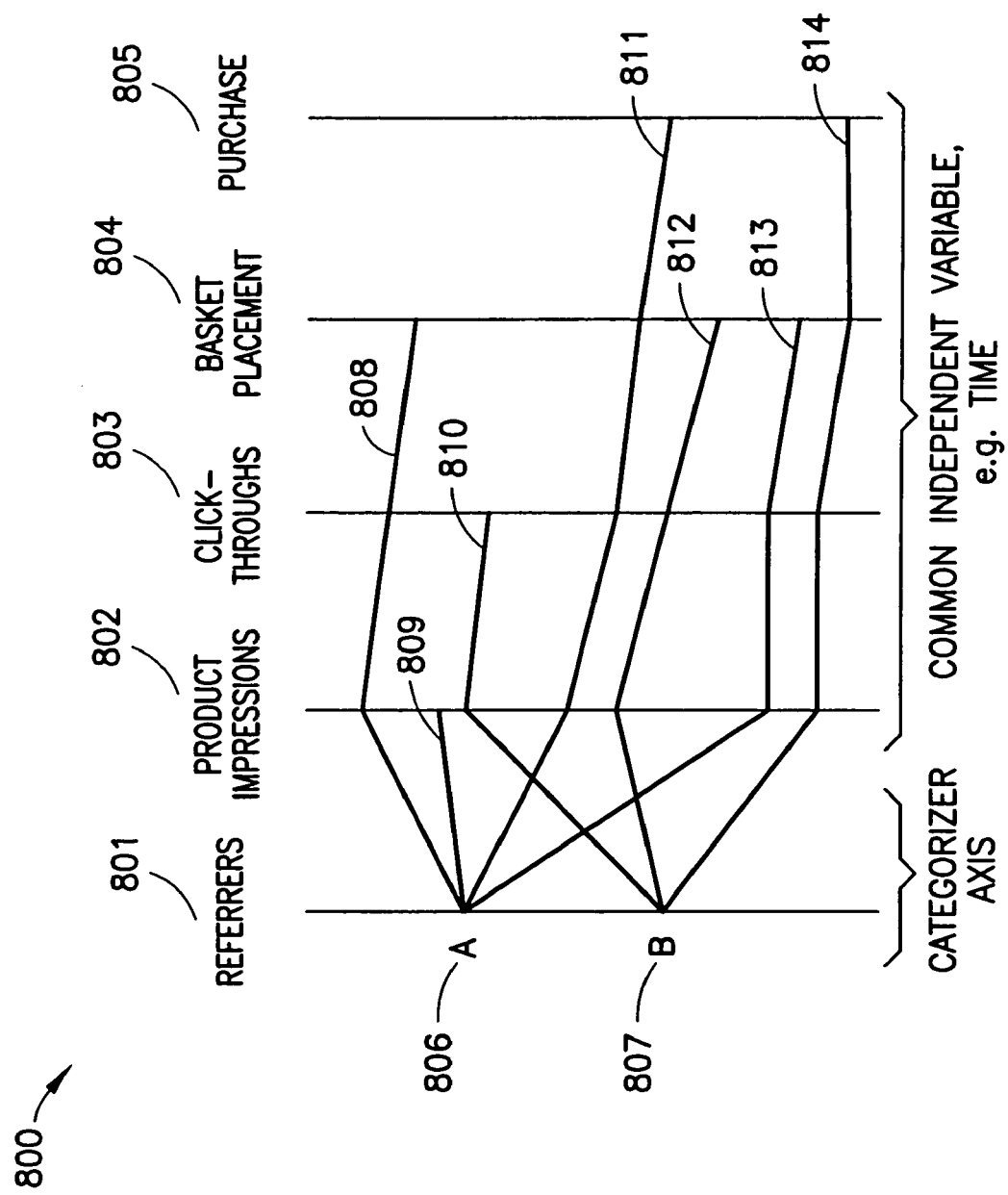
FIG. 8 is an example of micro-conversion visualization with a parallel coordinate system.

FIG. 8 (800) is an example of micro-conversion visualization with a parallel coordinate system. In this figure, each polygonal line represents a single session (501, 502 or 503) and its progression in an online store (103). The first parallel axis (801) represents a session categorizer, in this example, the initial referrer (506) of each session. There are two referrers in the figure, i.e., A (806) and B (807). The next four parallel axes represent shopping steps in an online store (103), i.e., product impression (802), clickthrough (803), basket placement (804), and purchase (805). For data points in the shopping step axes, timestamps of sessions are used. An advantage of using timestamps for data points is that because they are unique to individual sessions, no two sessions share the same data points in these axes. Using data points unique to individual sessions prevents the problem of overlaying lines between two parallel axes, which is serious in parallel coordinate visualizations, because it sometimes obscures the accuracy of visualizations. One disadvantage of using timestamps for data points is that they do not carry any sense of volume. Namely, the existence of a data point in a shopping step axis does not tell how many products were viewed, placed in basket, or purchased. Rather, it merely says that one or more products were viewed, placed or purchased.

In this figure, it is important to notice that some polygonal lines (808, 809, 810, 812, and 813) stop before they reach the last shopping step, i.e., purchase (805). The parallel coordinate system in this invention does not give a session a data point value for the next shopping step and beyond if the session does not convert to the next step. Hence, each polygonal line stops at the last step the session reached, which indicates the point the session leaves the store. This figure (800) shows that the number of lines connecting two adjacent parallel axes decreases, as polygonal lines go from left to right up to the purchase line (805). Dropouts of polygonal lines visualize where the store loses its customers.

Another note about this figure is that each polygonal line representing a session can be associated with one or more hyperlinks. Clicking on these hyperlinks brings up one or more Web pages providing more information about the associated session such as information about the session owner and products pursued in the session. This feature is referred to as hyperlink association.

Figure 9:
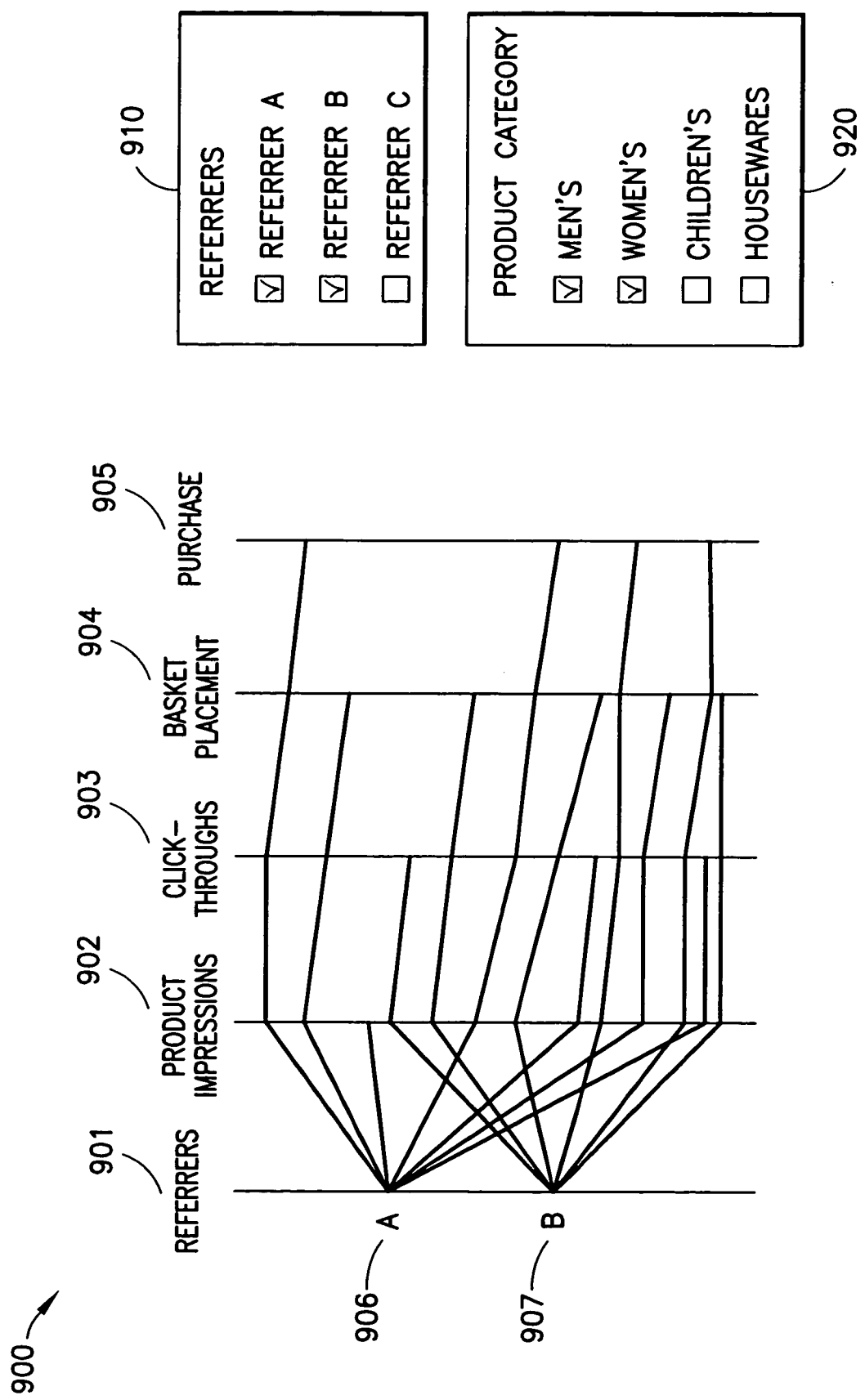
FIG. 9 is an example of micro-conversion visualization with filters.

FIG. 9 (900) is an example of micro-conversion visualization with filters. The parallel coordinate system in this invention can have zero or more filters which help users interactively select and/or de-select one or more groups of sessions and customers in the visualizations. A filter can be also related with the first parallel axis (901) which is a session categorizer. In this figure, there are two filters, i.e., referrer (910) and product category (920). The referrer filter (910) has three values, referrers A, B and C. In this example, referrers A and B are selected, but C is not. This referrer filter is also represented with the first parallel axis and two values, A (906) and B (907), are displayed. All the sessions visualized in this parallel coordinate system come from either A or B Web site. Real-world examples of referrers of interest may include portal sites such as Yahoo!, AltaVista, Lycos, and Excite@Home. The product category filter has four values, and two values among them, Men's and Women's are selected. Namely, all the sessions visualized in this figure see products from either the Men's or Women's category. In order to distinguish sessions which see Men's products from those which see Women's products, the parallel coordinate system may use different colors to display polygonal lines. For example, it uses blue to display polygonal lines of sessions which see Men's products, while it uses red for sessions which see Women's products.

FIG. 10 (1000) is an example of a session browsing more than one online store. When a shopper tries to find one or more products of interest either on the Internet or in the physical world, he/she often visits more than one store to browse and compare products sold in different stores. By aggregating Web server logs (400) from one or more online stores (103) with shoppers' session IDs commonly shared across multiple online stores, an extended sessionization process (109) can construct sessions browsing multiple online stores. In this figure (1000), a session denoted as S3 (1002), visits three stores, first, ST1, then, ST2, and finally, ST3 (1003). With the exception of the store column (1003), the session table (1000) contains the same attributes for sessions, i.e., timestamp (1001), session ID (1002), referrer (1004), current page (1005) and links (1006).

FIG. 11 (1100) is an example of micro-conversions of a session browsing more than one online store. From the extended session table shown in FIG. 10 (1000), an extended shopping step finder process (111) can generate a micro-conversion table for a session visiting multiple online stores. This figure (1100) shows the product impressions (1101), clickthroughs (1102), basket placement (1103), and purchases (1104) of the session, S3, shown in FIG. 10 (1000). Unlike the micro-conversion table for one online store (600), this table has store name, such as ST1, ST2, or ST3, in each data entry as well as timestamp and product name.

Figure 12:
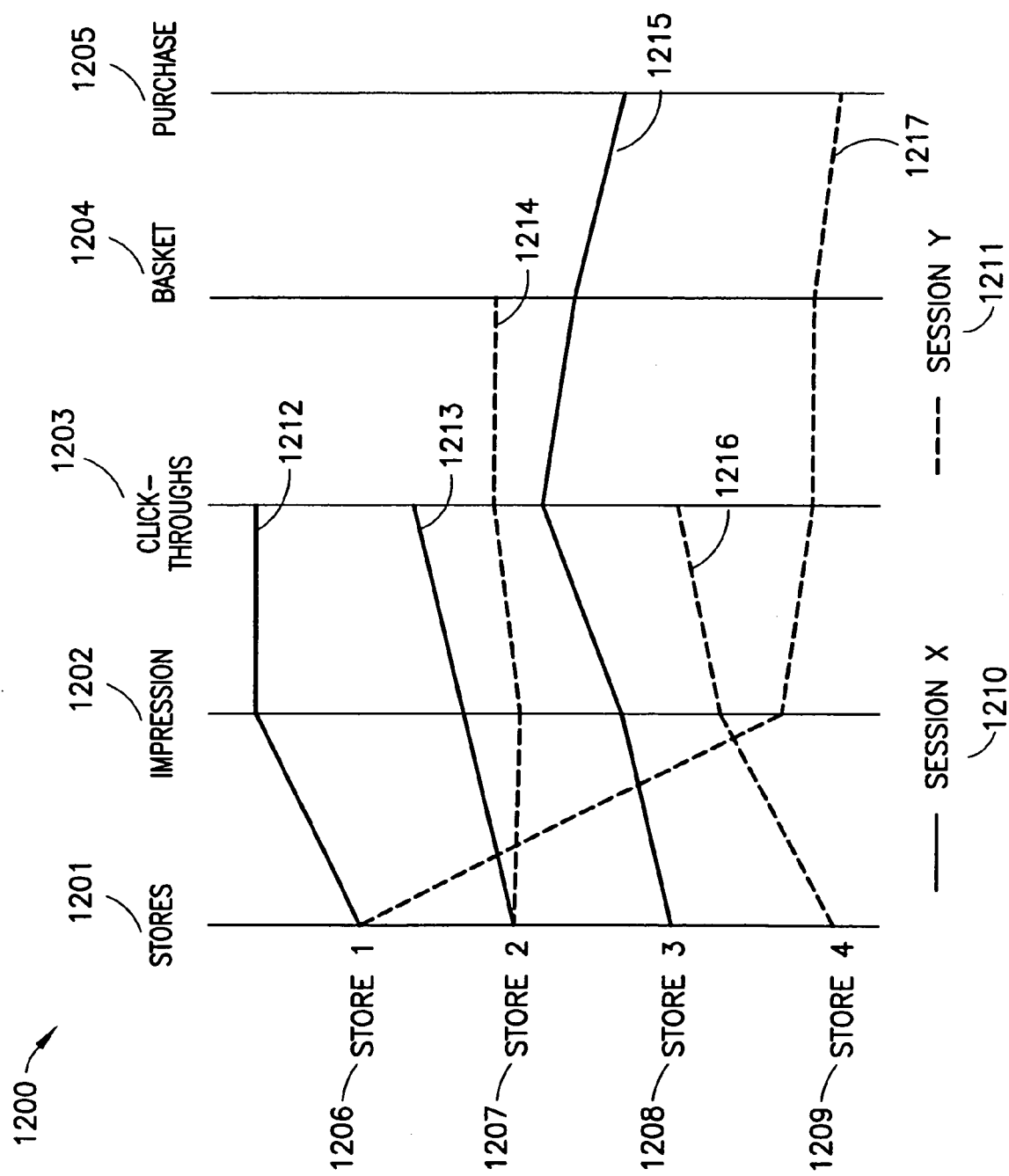
FIG. 12 is an example of visualizing sessions visiting more than one online stores.

FIG. 12 (1200) is an example of visualizing sessions visiting more than one online store. This figure visualizes the progression of two sessions, Session X (1210) and Session Y (1211), in four stores, Store 1 (1206), Store 2 (1207), Store 3 (1208), and Store 4 (1209). The first parallel axis (1201) in this parallel coordinate system uses store as the session categorizer. The next four axes (1202, 1203, 1204 and 1205) are the four shopping steps, i.e., product impressions, clickthroughs, basket placement and purchase, as before. Note that the data points in the shopping step axes are timestamps of the corresponding activities. The visualization illustrates that Session X (1210) first visited Store 1(1206) but left the store at the clickthrough step (1212). Then it (1210) visited Store 2 (1207) and again left the store at the clickthrough step (1213). Then Session X (1210) visited Store 3 (1208) and purchased from the store (1215). On the other hand, Session Y (1211) first visited Store 2 and left the store at the basket placement step (1214). Then it (1211) visited Store 4 (1209) but left the store at the clickthrough step (1216). Finally, Session Y (1211) visited Store 1 (1206) and purchased from the store (1217).

We claim:

1. A method of graphically representing clickstream data of a shopping session on a network comprising:
    extracting a plurality of shopping sessions from one or more Web server logs of one or more Web server systems of one or more online stores, said shopping sessions comprising shopping steps and said shopping steps comprising at least one of product viewing, product selection, shopping cart placement and purchase;
    deriving micro-conversions from the plurality of shopping sessions, the micro-conversion comprising a shopper's progress from one shopping step to another;
    in response to a request, grouping the micro-conversions according to the shopping steps of the shopping sessions such that each micro-conversion group terminates in the shopping step where its shopping session ends, at least one micro-conversion group terminating at the purchase shopping step and at least one micro-conversion group terminating at other than the purchase shopping step; and
    graphically representing, on a computer-generated graphical display, clickstream data from each of the micro-conversion groups in a first visualization, the first visualization comprising at least three axes representing the shopping steps and lines that each correspond to one of the micro-conversion groups, wherein one of the axes represents the purchase shopping step.

2. A method, as in claim 1, where the first visualization comprises a parallel coordinate system and one or more extension components including one or more parallel axes of sequential events, one or more dependent variable values of timestamps, one or more filters, one or more categorizers, and one or more hyperlink associations.

3. A method, as in claim 2, where the parallel coordinate system comprises a series of parallel lines that are placed equidistantly, each parallel line representing a specific dependent variable and dependent variable values being plotted along a respective axis, and an independent variable that is represented by polygonal lines connecting the corresponding dependent variable values.

4. A method, as in claim 2, where the dependent variable values of timestamps is an assignment of timestamp values as data points to a series of sequential events that are assigned to the equal number of parallel axes in a parallel coordinate system.

5. A method, as in claim 2, where the filter is a means to select one or more groups of polygonal lines viewed in the parallel coordinate system.

6. A method, as in claim 2, where the categorizer is a parallel axis in the parallel coordinate system for categorizing polygonal lines of the first visualization.

7. A method, as in claim 6, where the categorizer includes at least one of the following: referrer Web sites of sessions, internet service providers of sessions, lengths of sessions, methods used to find product information by session, methods used to find service information by sessions, products viewed, services viewed, items placed in a shopping cart, items purchased by sessions, time points of sessions, geographic regions where sessions originate, age, sex, education, and income of session originators, sales history of owners of sessions, and Web page patterns accessed by one of sessions and owners of sessions.

8. A method, as in claim 2, where the hyperlink association is association of at least one hyperlink with the line representing a session, and the line comprises a hyperlink to a Web page that provides additional information of the session.

9. A method, as in claim 1, wherein at least the first visualization represents, via dropouts of one or more lines, where the online store loses customers.

10. A method, as in claim 1, further comprising displaying additional information of one or more sessions on at least one Web page by using at least one hyperlink association.

* * * * *